United States Patent
Dinh-Trong et al.

(10) Patent No.: US 9,571,533 B2
(45) Date of Patent: Feb. 14, 2017

(54) GRAPHICAL ENVIRONMENT FOR ADDING LIAISON AGENTS TO A COMMUNICATION SESSION

(71) Applicant: Avaya Inc., Basking Ridge, NJ (US)

(72) Inventors: Trung Thanh Dinh-Trong, Bedminster, NJ (US); Birgit A. Geppert, Warren, NJ (US); Frank M. Roessler, Warren, NJ (US)

(73) Assignee: Avaya Inc., Basking Ridge, NJ (US)

(*) Notice: Subject to any disclaimer, the term of this patent is extended or adjusted under 35 U.S.C. 154(b) by 275 days.

(21) Appl. No.: 13/887,628

(22) Filed: May 6, 2013

(65) Prior Publication Data
US 2014/0189005 A1    Jul. 3, 2014

Related U.S. Application Data

(60) Provisional application No. 61/746,914, filed on Dec. 28, 2012.

(51) Int. Cl.
*H04L 29/06*    (2006.01)

(52) U.S. Cl.
CPC ........ *H04L 65/403* (2013.01); *H04L 65/1069* (2013.01)

(58) Field of Classification Search
CPC ... G06Q 10/10; H04L 29/06; H04L 29/08072; H04L 65/403

(Continued)

(56) References Cited

U.S. PATENT DOCUMENTS

| 6,574,471 B1* | 6/2003 | Rydbeck | H04M 1/663 455/418 |
| 2004/0201710 A1* | 10/2004 | Uchihashi | H04N 5/232 348/211.2 |

(Continued)

FOREIGN PATENT DOCUMENTS

| EP | 2237533 | 10/2010 |
| EP | 2317692 | 5/2011 |

(Continued)

OTHER PUBLICATIONS

Microsoft, Call Forwarding in Microsoft Office Communicator, retrieved from http://blogs.technet.com/b/lync/archive/2008/05/29/call-forwarding-in-microsoft-office-communicator.aspx, May 2008.*

(Continued)

*Primary Examiner* — Nicholas Taylor
*Assistant Examiner* — Chong G Kim
(74) *Attorney, Agent, or Firm* — Sheridan Ross P.C.

(57) ABSTRACT

A communication session is established between users of communication devices. A representation of the users is displayed as part of the communication session. A liaison agent is dynamically added as a party of the communication session. The liaison agent is an application that works on behalf of one or more user during the communication. In response to dynamically adding the liaison agent as a party of the communication system, the displayed representation of the communication session is updated to indicate that the liaison agent has been added to the communication session. The liaison agent can provide a variety of services to a user, such as tracking work product, handling incoming calls, bridging communication sessions, providing web cam services, doing surveys, gathering a roll of a communication (Continued)

session, playing messages, notifying other users of events in the communication session, and/or the like.

20 Claims, 11 Drawing Sheets

(58) Field of Classification Search
USPC .......................................................... 709/204
See application file for complete search history.

(56) References Cited

U.S. PATENT DOCUMENTS

| | | |
|---|---|---|
| 2009/0086957 A1 | 4/2009 | Kelley et al. |
| 2009/0265640 A1* | 10/2009 | Abernethy ............. G06Q 30/02 715/751 |
| 2010/0246570 A1 | 9/2010 | Chavez et al. |
| 2010/0246571 A1* | 9/2010 | Geppert et al. ............... 370/352 |
| 2010/0246793 A1 | 9/2010 | Geppert et al. |
| 2010/0246800 A1 | 9/2010 | Geppert et al. |
| 2010/0251119 A1 | 9/2010 | Geppert et al. |
| 2010/0251124 A1 | 9/2010 | Geppert et al. |
| 2010/0251127 A1 | 9/2010 | Geppert et al. |
| 2010/0251142 A1 | 9/2010 | Geppert et al. |
| 2010/0251158 A1 | 9/2010 | Geppert et al. |
| 2010/0251177 A1 | 9/2010 | Geppert et al. |
| 2011/0258550 A1* | 10/2011 | Dinh-Trong et al. ......... 715/736 |
| 2011/0270933 A1* | 11/2011 | Jones et al. ................... 709/206 |
| 2011/0271204 A1* | 11/2011 | Jones et al. ................... 715/753 |
| 2012/0030301 A1* | 2/2012 | Herold et al. ................ 709/206 |
| 2012/0059896 A1* | 3/2012 | Li ................................. 709/206 |
| 2012/0124485 A1 | 5/2012 | Scherpa |
| 2014/0066035 A1* | 3/2014 | Melin .................... H04W 4/16 455/416 |

FOREIGN PATENT DOCUMENTS

| | | |
|---|---|---|
| EP | 2587370 | 5/2013 |
| WO | WO 2009/089585 | 7/2009 |

OTHER PUBLICATIONS

Webex, Using the Polling Feature, retrieved from http://wlc.webex.com/docs/job_aids/EC6_Polling_JA_EN.pdf, Aug. 2007.*

Combined Search and Examination Report for United Kingdom Patent Application No. GB1322553.7, dated Jun. 18, 2014 8 pages.

Avaya 2009 Voice con Video screenshot. (1 pg).

Avaya FLARE Public Safety Dispatch Interface Concept. Available at: www.youtube.com/watch?v=hjjCVncfR8o.

Google Wave: Ribbit VOIP Voice Conference Gadget for Real Time Communication. Retrieved from: www.zyxaw.com/2009/10/google-wave-ribbit-voip-voice.html. 7 pgs.

Todoit-wave—Task List Gadget for Google Wave—Google Project Hosting. Retrieved from: www.code.google.com/p/todoit-wave/. 2 pgs.

Chapter 3: jQuery UI Widgets. Retrived from: www.msdn.microsoft.com/en-us/library/hh404085.aspx. 21 pgs.

Salber, D. et al., "The Context Toolkit: Aiding the Development of Context-Enabled Applications." www.cc.gatech.edu/fce/context-toolkit/pubs/chi99.pdf. May 1999. 8 pgs.

Official Action for United Kingdom Patent Application No. GB1322553.7, dated Apr. 9, 2015 3 pages.

Official Action for United Kingdom Patent Application No. GB 1322553.7, dated Aug. 19, 2015 3 pages.

* cited by examiner

GRAPHICAL ENVIRONMENT FOR ADDING LIAISON AGENTS TO A COMMUNICATION SESSION

RELATED U.S. PATENT APPLICATION DATA

This application claims the benefit under 35 U.S.C. §119 (e) of U.S. Provisional Application No. 61/746,914, filed Dec. 28, 2012, entitled "GUI FOR ADDING INTERACTIVE WIDGETS AS A PARTY TO A COMMUNICATION SESSION OR A SIDEBAR," which is incorporated herein by reference.

TECHNICAL FIELD

The systems and methods that relate to collaboration systems and in particular to unified collaboration systems.

BACKGROUND

Today, the use of interactive collaboration systems is becoming increasingly pervasive. Today's systems make it much easier for users to collaborate. However, the uses of automated attendants that are part of a communication session have been limited. These automated attendants mainly act in the background and are not dynamic or act outside of a communication session. For example, a leader of a conference may record the conference by entering a number such as *7. However, there is no mechanism where these types of attendants can be added dynamically using a graphical user interface. Moreover, these attendants are not able to actively take the place of a user of the communication session. For example, if the user cannot make a conference call, the user may have to try and contact the other participants or send a representative to the conference. What is needed is a way to overcome the limited capabilities of the current automated attendants and provide users with increased flexibility for managing communications.

SUMMARY

Systems and methods are provided to solve these and other problems and disadvantages of the prior art. A communication session is established between users of communication devices. A representation of the users is displayed as part of the communication session. A liaison agent is dynamically added as a party of the communication session. The liaison agent is an application that works on behalf of one or more users during the communication. In response to dynamically adding the liaison agent as a party of the communication system, the displayed representation of the communication session is updated to indicate that the liaison agent has been added to the communication session.

The liaison agent may be added by a party that is part of the communication or by a party that is not part of the communication session. The liaison agent can provide a variety of services, such as tracking work product of a communication session, handling incoming calls for a user, bridging communication sessions, providing web camera (web cam) services, doing surveys for the user, gathering attendance information of a communication session for the user, playing messages, notifying other users of events in the communication session, notifying other users of events in other communication sessions, and/or the like.

DETAILED DESCRIPTION

Figure 1:
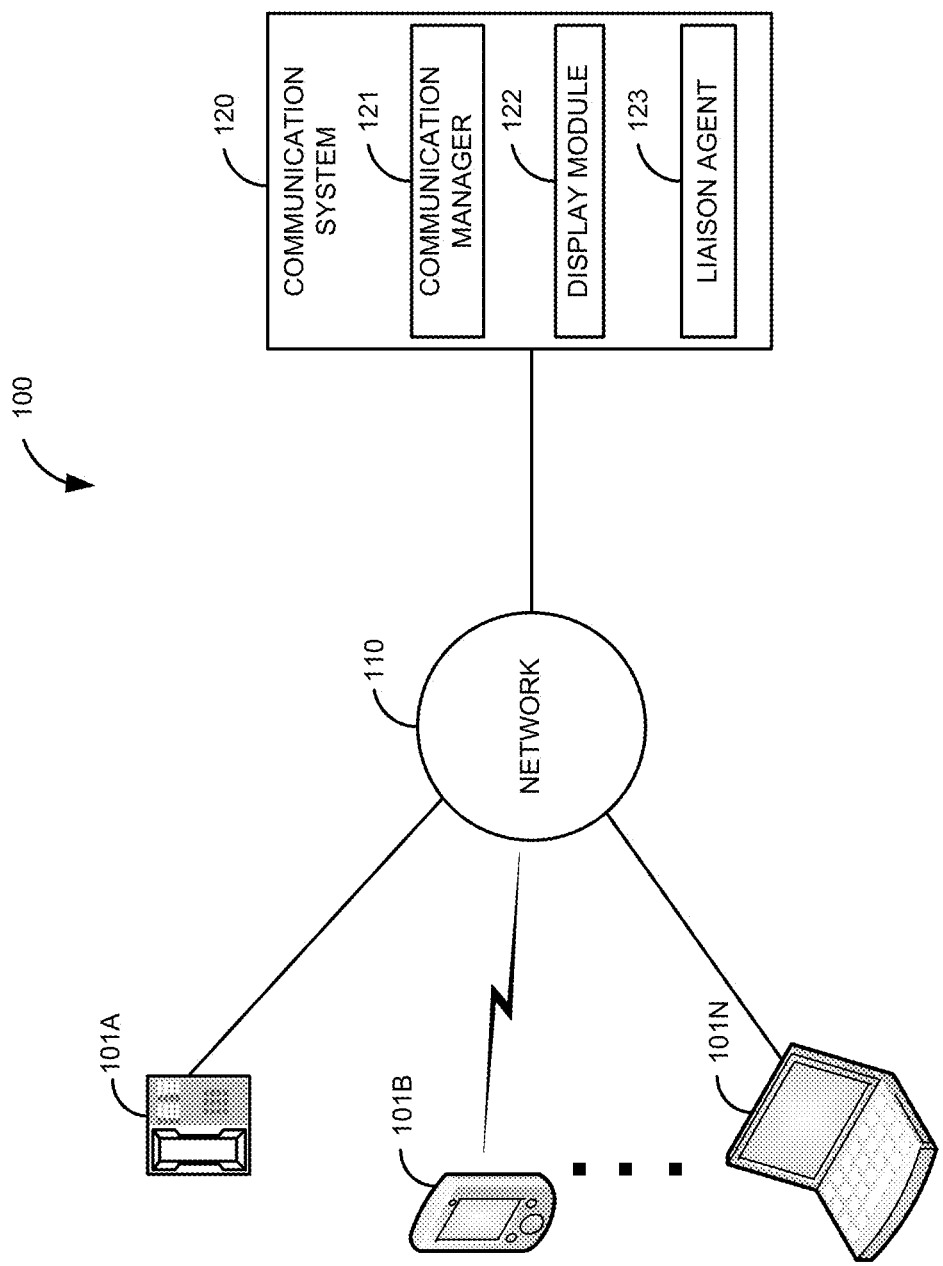
FIG. 1 is a block diagram of a first illustrative system for dynamically adding a liaison agent to a communication session.

FIG. 1 is a block diagram of a first illustrative system 100 for dynamically adding a liaison agent 123 to a communication session. The first illustrative system 100 comprises communication devices 101A-101N, a network 110, and a communication system 120.

The communication devices 101A-101N may be any device that can communicate on the network 110, such as a Personal Computer (PC), a telephone, a video system, a cellular telephone, a Personal Digital Assistant (PDA), a tablet device, a notebook device, a server, and the like. As shown in FIG. 1, any number of communication devices 101A-101N may be connected to network 110, including only a single communication device 101. In addition, the communication devices 101A-101N may be directly connected to the communication system 120.

The network 110 can be any network or collection of networks that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.323, and the like.

The communication system 120 can be any hardware/software that can communicate on the network 110, such as a Private Branch Exchange (PBX), a central office switch, a Instant Messaging system, a video bridge, an audio bridge, a mixer, a text messaging server, an email server, and/or the like. The communication system 120 further comprises a communication manager 121, a display module 122, and a liaison agent 123.

The communication manager 121 can be any hardware/software that can handle communications, such as a PBX, a central office switch, an Instant Messaging system, a video bridge, an audio bridge, a mixer, a text messaging server, an email server, and/or the like. The display module 122 can be any hardware/software that can generate a display, such as a web server, a video card, a video processor, a distributed application, and/or the like. The liaison agent 123 can be any hardware/software that can provide services on behalf of users of the communication devices 101A-101N and/or on behalf of other automated entities. The liaison agent 123 can be an automated or semi-automated application that works on behalf of a user to a communication session and/or another automated or semi-automated application to a different communication session.

The communication system 120, the communication manager 121, the display module 122, and the liaison agent 123 are shown in FIG. 1 as being separate from communication devices 101A-101N. However, in other embodiments, such as a peer-to-peer environment, the communication system 120, the communication manager 121, the display module 122, and the liaison agent 123 may be implemented in the communication device(s) 101. Alternatively, the various components (121-123) of the communication system 120 may be distributed between the communication device(s) 101 and the communication system 120.

Figure 3:
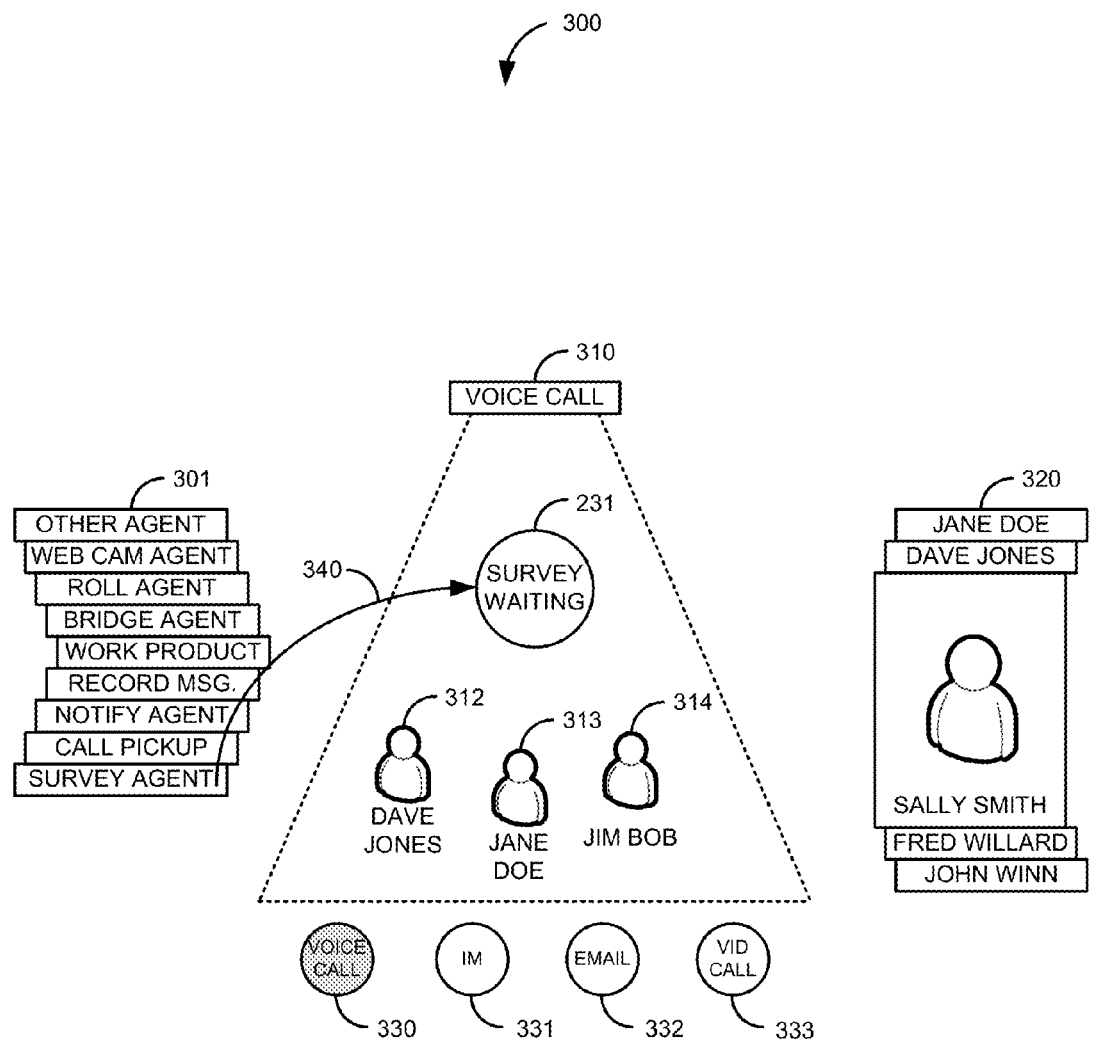
FIG. 3 is a diagram of a graphical user interface for dynamically adding a liaison agent to a communication session.

A communication session is established, via the communication manager 121, between two or more users of the communication devices 101. A communication session may be established in various ways, such as by placing a call from one of the communication devices 101A-101N, by making a call from the communication system 120, and the like. Alternatively, a communication may be established by setting up a chat or Instant Messaging session. In some embodiments, the communication session is setup from a communication manager 121 that resides in the communication device. For example, by initiating a call/chat/Instant Message from the communication device 101. The display module 122 displays a representation of the users as part of the communication session. For example, a display as shown in FIG. 3 may be shown to two or more users in a communication session. A liaison agent 123 is dynamically added as a party of the communication session. The liaison agent 123 acts on behalf of at least one user. The user may be one of the users involved in the communication session or the user may not be part of the communication session. In response to dynamically adding the liaison agent 123 to the communication session, representation of the liaison agent is updated to indicate that the liaison agent has been added to the communication session.

In this embodiment, the communication manager 121, the display module 122 and the liaison agent 123 are shown as part of communication system 120. However, in other embodiments, the display module 122, the communication manager 123 may be in the communication device 101. For example, a communication manager 121 in communication device 101A can initiate a call with communication device 101B. A display module 122 in communication device 101A displays the representation of the plurality of users as part of the communication on communication device 101A. The display module 122 in the communication device 101A updates the display to indicate that the liaison agent 123 has been added to the communication session.

The liaison agent 123 can be any service/widget that can provide services on behalf of a user. The liaison agent 123 can be added at any time during the communication session and/or based on any event in the communication session. For example, the liaison agent 123 can be added based on the creation of the communication session (e.g., automatically during setup of the communication session), during the communication session (e.g., after the communication session has been established but before the session has ended), at the end of the communication session, as a user leaves the communication session, as a user joins the communication session, based on creation of a sidebar session, based on an agenda item in the communication session, based on a timer, based on a calendar event, based on any type of a user input, automatically, and/or the like.

The liaison agent 123 can be viewed by or made accessible to a single user, specific users, or all users of the communication session in which the liaison agent 123 has been added, and/or users involved in other communication sessions. For example, a user may add web cam agent (a liaison agent 123) that allows a single user to view different video feeds of the communication session. Alternatively, a user may add a work product agent (a liaison agent 123) that all participants in a multi-media conference can view. In another embodiment, the work product agent can be added to the communication session where only specifically designated users can see the work product agent (e.g., a supervisor and moderator of the communication session).

Figure 2:
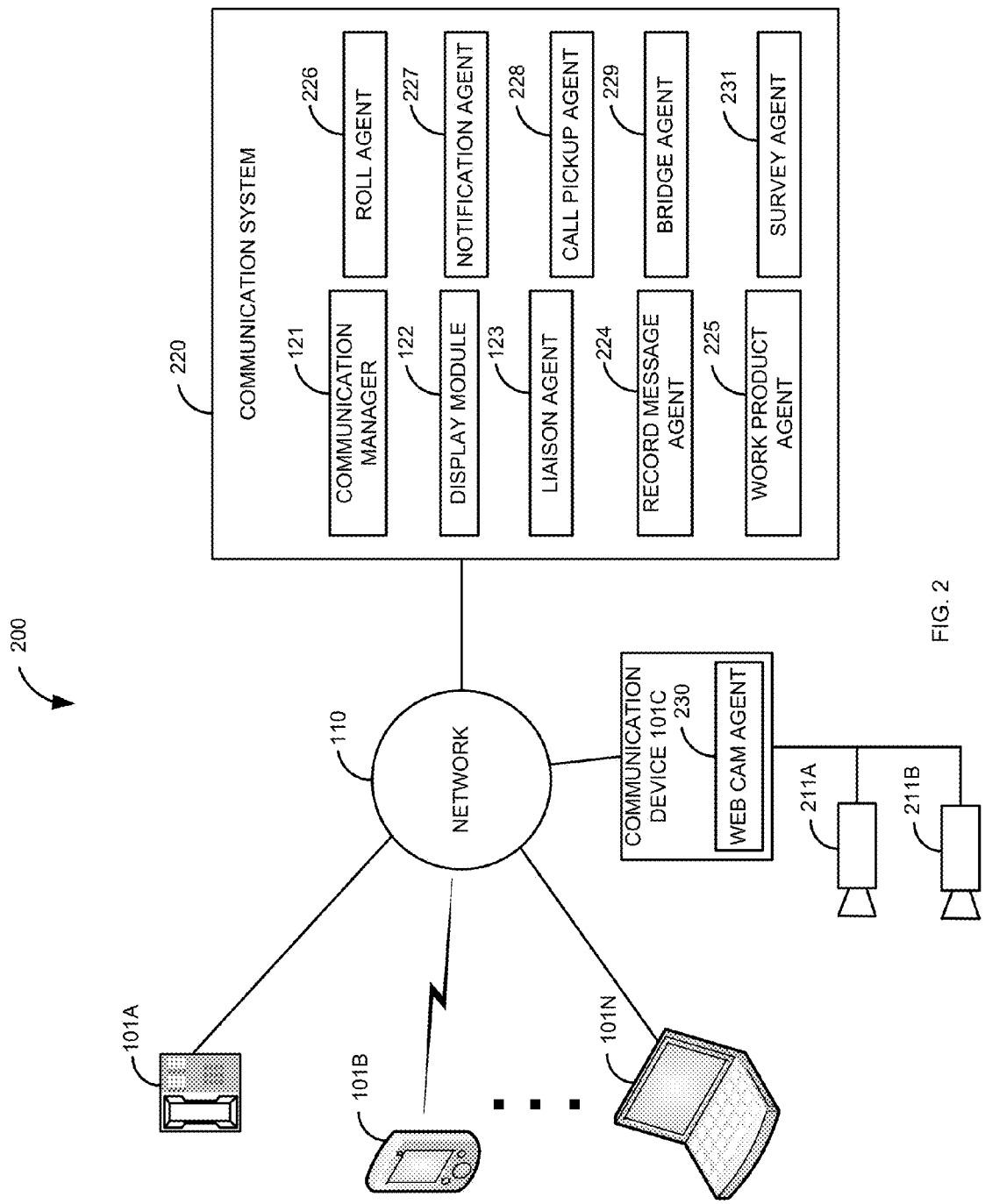
FIG. 2 is a block diagram of a second illustrative system for dynamically adding a liaison agent to a communication session.

FIG. 2 is a block diagram of a second illustrative system 200 for dynamically adding a liaison agent 123 to a communication session. The second illustrative system 200 comprises the communication devices 101A-101N, the network 110, and a communication system 220. The second illustrative system 200 also comprises a communication device 101C. The communication device 101C comprises a web cam agent 230. The web cam agent 230 is connected to video cameras 211A and 211B.

The communication system 220 comprises the communication manager 121, the display module 122, and the liaison agent 123. The liaison agent 123 can provide a variety of services on behalf of a user. For example, the liaison agent 123 may be a record message agent 224, a work product agent 225, a roll agent 226, a notification agent 227, a call pickup agent 228, a bridge agent 229, the web cam agent 230, the survey agent 231, and the like.

The record message agent 224 is a liaison agent 123 that can record a message for a user. For example, the record message agent 224 can take the place of a user who is not part of the communication session to play a message/video based on an event in the communication session, such as based on a specific slide that is displayed in the communication, at a specific time (e.g., at the beginning of the communication session), based on a specific agenda item and/or the like. The message/video may be played/displayed by the record message agent 224 based on a user clicking on a button displayed in the record message agent 224.

The work product agent 225 is a liaison agent 123 that maintains work product. The work product 225 agent can be used a part of a current communication session. Users can add documents, schedules, status reports, history, and the like during the communication session. This information can be retrieved by adding the work product agent 225 in a later communication session (e.g., a reoccurring communication session). The users can the access the information from the previous communication session using the work product agent 225.

The roll agent 226 is a liaison agent 123 can take a roll of participants on behalf of the user who is not part of the communication session. The roll agent 226 can then report the roll to the user who is not part of the communication session. For example, the supervisor can setup the conference call so that the roll agent 226 is added at the beginning of the conference call. The roll agent then queries each of the communication devices 101 and asks the user(s) at each communication device 101 to provide their name(s) (e.g., via text or voice). The roll agent 226 may also determine the roll of the communication session via facial recognition, via caller ID, and/or the like. The roll agent 226 reports the roll to the user who is not part of the communication session. Alternatively, the user may be part of the communication session and the roll agent 226 may report the results only to the user.

The notification agent 227 is a liaison agent 123 that notifies one or more other users that are not involved in the communication session, on behalf of a user who is not part of the communication session; the notification may be of an event in the communication session. For example, if a supervisor cannot make a conference call and needs to have a representative to discuss a specific agenda item. The supervisor can setup the system so that the notification agent 227 is dynamically added to the conference call when the conference call begins. At a designated time before the agenda item, the notification agent 227 notifies the one or more other users about the upcoming agenda item and asks the one or more users to call in to the conference call.

The call pickup agent 228 is a liaison agent 123 that can handle any incoming call, such as a voice call, a video call, or a text call. The call pickup agent 228 can handle the call based on a message entered by a user in the communication session, a selected predefined message, sending an email to a caller of the incoming call, sending an Instant Message to the caller of the incoming call, directing the incoming call to a voice mail of the user, and/or the like.

The bridge agent 229 is a liaison agent 123 that can bridge two or more communication sessions. The bridge agent 229 allows a user to bridge/un-bridge a communication session. The communication sessions that are bridged/un-bridged may be in different communication mediums. For example, one communication session may be a video communication session and the other may be an audio communication session. Likewise, one communication session may be an audio communication session and the other may be a text based communication session. If one of the communication sessions is in audio and the other in text, the system can convert the text to audio and the audio text so that the bridged participants can communicate.

The web cam agent 230 is a liaison agent 123 that may allow a user to view one or more video feeds. For example, the user may add the web cam agent 230 and select a front view of a conference room from the video camera 211A or a rear view from the video camera 211B. Alternatively, the user may select a side view or a view of an external web cam. The user may have the ability to pan in/out or move the view of one or more of the video cameras 211 using the web cam agent 230.

The survey agent 231 is a liaison agent 123 that can act on behalf of a user to perform a survey. For example, the survey agent 231 can survey users that are still in the communication session and report the results to a user that has left the communication session.

FIG. 3 is a diagram of a graphical user interface 300 for dynamically adding a liaison agent 123 to a communication session. The graphical user interface 300 comprises a liaison agent rolodex 301, a first communication spotlight 310, a survey agent 231, user icons 312-314, a user rolodex 320, a voice call button 330, an Instant Message button 331, an email button 332, and a video call button 333.

The liaison agent rolodex 301 is a list of different liaison agents 123 that a user can add to a communication session. In this example, the liaison rolodex 301 is shown as a list of liaison agents 123. However, in other embodiments, other types of options may be used to display liaison agents 123, such as a list, a menu, a grouping of icons, and/or the like. The user rolodex 320 is a graphical representation of users that can be added to a communication session. The first communication spotlight 310 is an area in the graphical user interface 300 where a user can drag the user icons 312-314 from the user rolodex 320 to initiate a communication session. The type of communication session that is initiated is based on which buttons 330-333 have been selected by the user. The user (Jim Bob), by selecting the voice call button 330 (as shown by the grey highlight) and dragging and dropping user icons 312-313 from the user rolodex 320 has established a voice communication session with Dave Jones and Jane Doe as shown in FIG. 3. If the user (Jim Bob) wanted to add Sally Smith to the communication session, he can drag-in-drop the icon of Sally Smith from the user rolodex 320 into the communication spotlight 310. The communication spotlight 310 is an example of the Avaya Flare® user interface that is part of the Avaya Flare Experience™. However, the processes described herein may be used with any process that displays users that are part of a communication session. For example, the user could be part of the communication session based adding the user from a list, adding the user to a ring of users on a communication session, adding the user to a star view of users on the communication session and/or the like. In addition, how the liaison agents 123 are displayed can vary based on the type of communication device 101 and/or the screen size of the communication device 101.

In this example, the user (Jim Bob) has added the survey agent 231 by dragging-in-dropping 340 the survey agent 231 from the liaison agent rolodex 301 while the conference between Dave Jones, Jane Doe, and Jim Bob is still in progress. In this example, the survey agent's status is set to waiting. This is because the survey agent 231, in this example, does not become activate until the user Jim Bob leaves the communication session. However, in other embodiments, the survey agent 231 may become active when the survey agent 231 is added to the conference, based on a defined time, based on an agenda, and the like.

Figure 4:
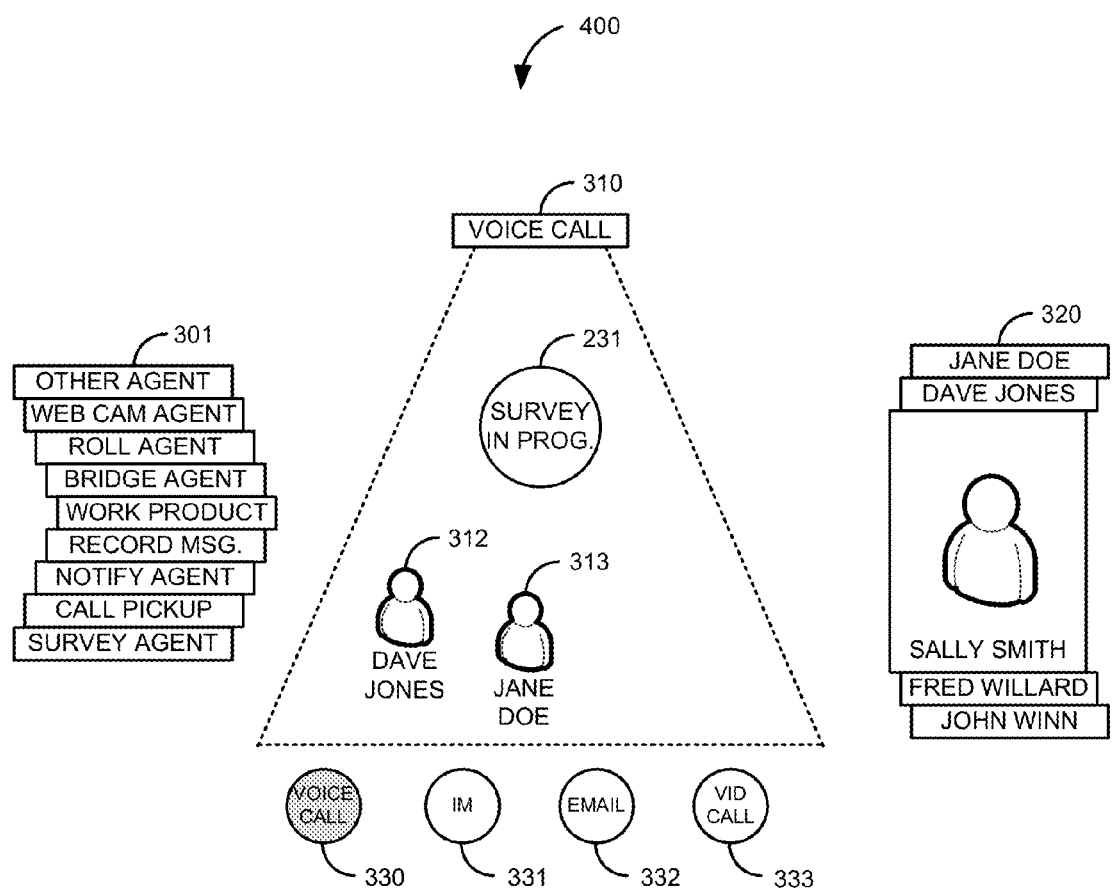
FIG. 4 is a diagram of a graphical user interface for displaying the progress of a liaison agent.

FIG. 4 is a diagram of a graphical user interface 400 for displaying the progress of a liaison agent 123. FIG. 4 is a continuation of what is displayed to users as the voice call of FIG. 3 progresses. In this example, Jim Bob has left the communication session. Based on Jim Bob leaving the communication session, the survey agent 231 surveys the users that are still in the communication session (Dave Jones and Jane Doe). This is indicated by the activity of the survey agent 231, which states that the survey is in progress (i.e., the survey agent 231 is busy). The survey agent 231 may survey the users by playing a message and having the users provide voice or Dual Tone Multi Frequency (DTMF) responses. Once the survey is complete and the survey agent 231 has compiled the results of the survey of the users still on the communication session, the survey agent 231 contacts the user (Jim Bob) with the results of the survey. The survey agent 231 can contact the user (Jim Bob) with the survey results in various ways. For example, via an email, via a voice message, via a voice call, via Instant Message, and/or the like.

This example of changing status is based on the survey agent 231. However, the status can also vary based on a type of the liaison agent 123. For example, the status can be changed based on various criteria, such as, an availability/unavailability of the liaison agent 123. The status may indicate that liaison agent 123 is not available based on a specific task that is being performed. Once the task is performed, the status may change again. Alternatively, a liaison agent 123 may not be available to a user based on various criteria. For example, only a manager may be able to add a bridge agent 229. Once added to a communication session, only the manager may control the bridge agent 229 (even though other user may be able to see the bridge agent 229). The status can be indicated in various ways, such as by a flag, a color, a size, a text, an icon, and/or the like.

Figure 5:
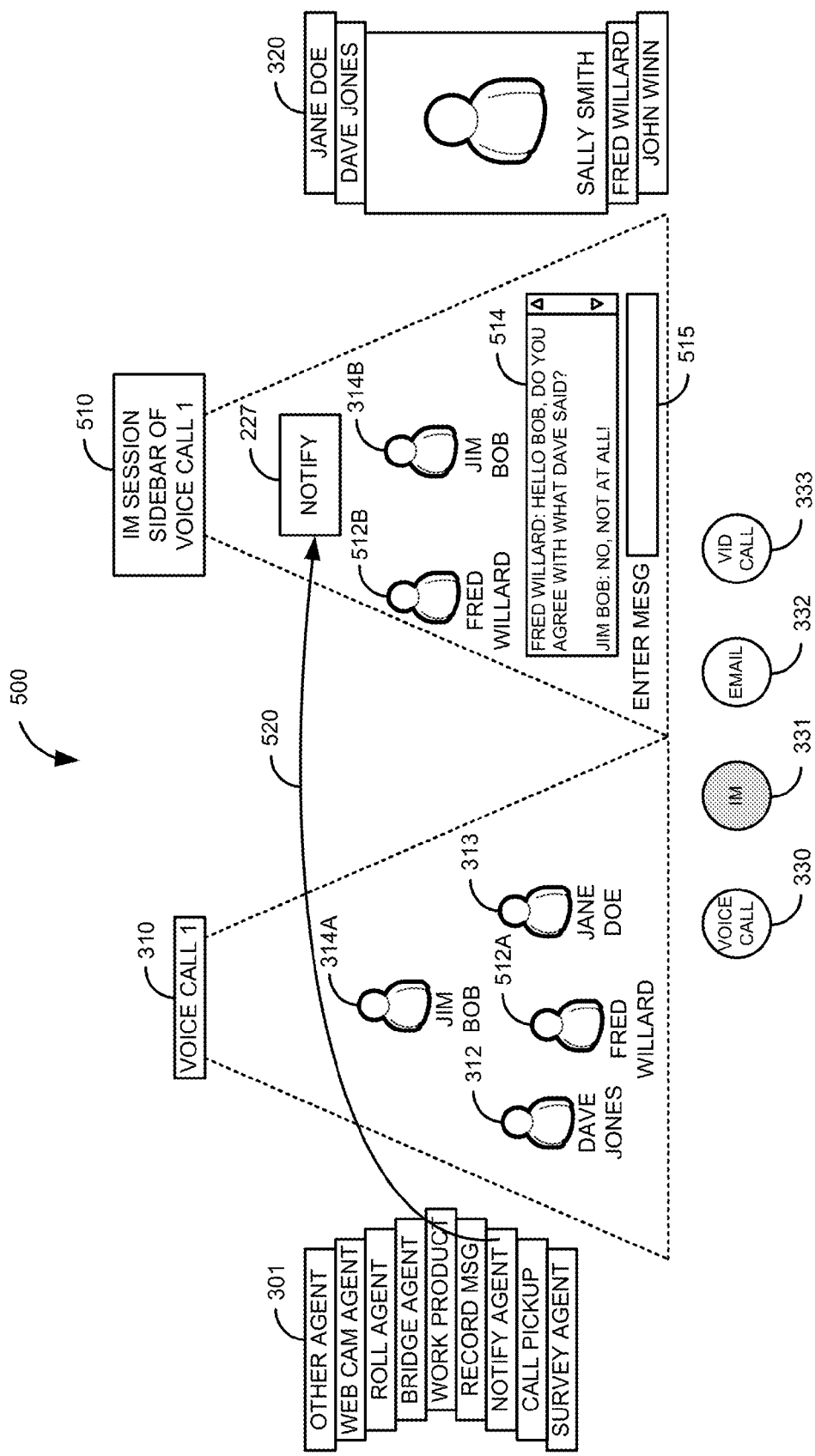
FIG. 5 is a diagram of a graphical user interface for displaying a sidebar session containing a liaison agent.

FIG. 5 is a diagram of a graphical user interface 500 for displaying a sidebar session containing a liaison agent 123. The graphical user interface 500 comprises the liaison agent rolodex 301, the first communication spotlight 310, the user icons 312-313, 314A, 314B, 512A, and 512B, the user rolodex 320, the voice call button 330, the Instant Message button 331, the email button 332, the video call button 333, a sidebar spotlight 510, a Instant Message window 514 and an Instant Message entry box 515.

The user can create a sidebar communication of another communication session. In this example, the user (Jim Bob) creates the initial voice communication session with Dave Jones, Fred Willard, and Jane Doe as illustrated by user icons 312, 313, 314A, and 512A in the first communication spotlight 310. The user (Jim Bob) has also created a sidebar communication of the voice communication session. In this example, the user selected the Instant Message button to select an Instant Message session for the sidebar communication. The user dragged-in-dropped user icon 512B into the sidebar spotlight 510. In this example, the user wants to add a notification agent 227 to Instant Message communication session, so the user drags-in-drops 520 the notification agent into the sidebar spotlight 510. As the user (Jim Bob) communicates with Fred Willard, the conversation is displayed in the Instant Message window 514. The user can respond by typing messages in the Instant Message entry box 515. The notification agent 227 can notify another user not involved in the side bar Instant Message communication based an event that occurs in the side bar communication. For example, the notification agent 227 can notify another user based on a word or phrase in the Instant Message communication, based on a time, and/or the like. The notification may be to join the Instant Message communication or to perform a task for the user.

Figure 6:
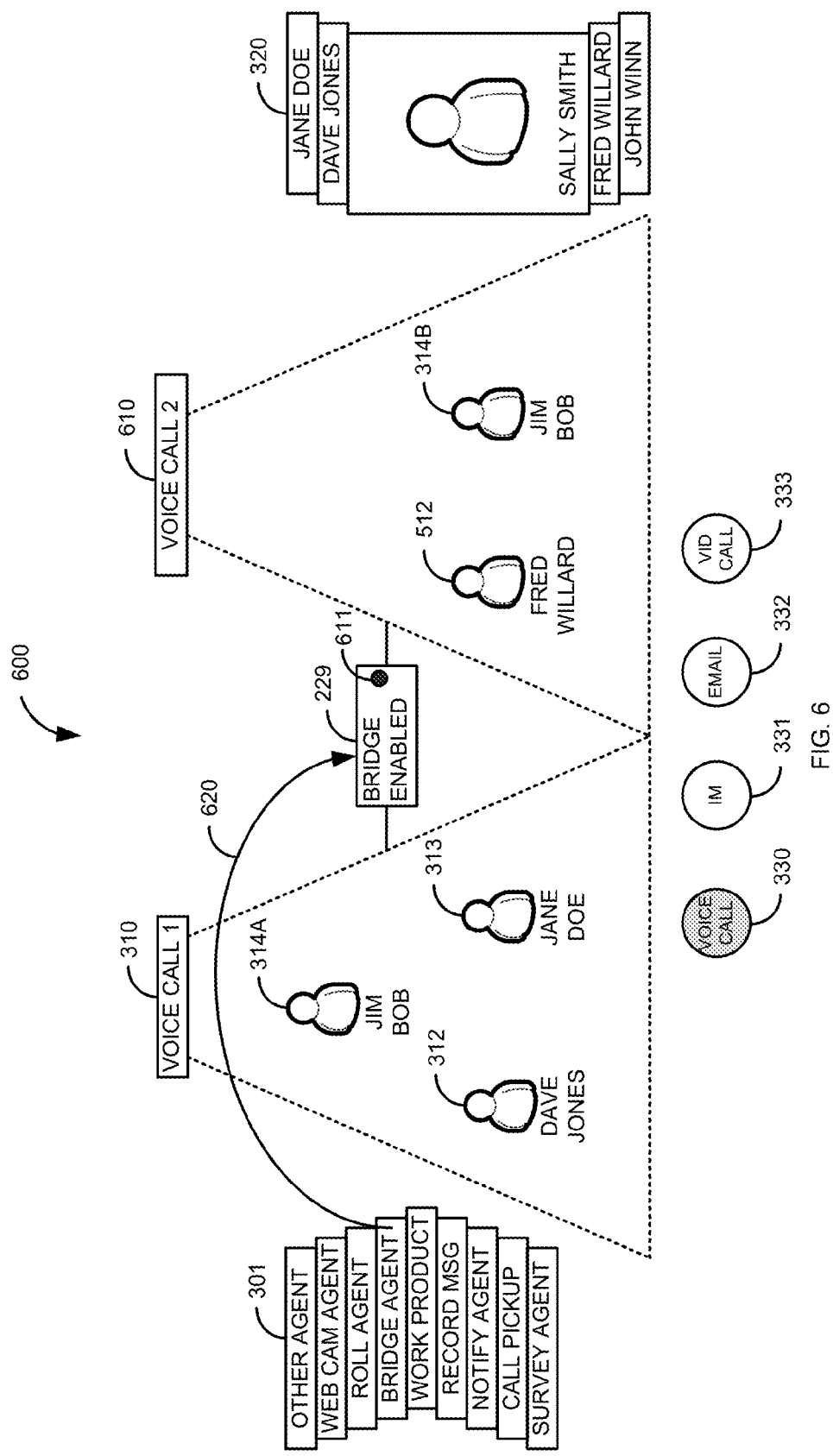
FIG. 6 is a diagram of graphical user interface for adding a bridge agent that can control bridging between two communication sessions.

FIG. 6 is a diagram of graphical user interface 600 for adding a bridge agent 229 that can control bridging between two communication sessions. The graphical user interface 600 comprises the liaison agent rolodex 301, the first communication spotlight 310, the user icons 312-313, 314A, 314B, and 512, the user rolodex 320, the voice call button 330, the Instant Message button 331, the email button 332, the video call button 333, a second communication spotlight 610, and the bride agent 229. The bridge agent 229 also comprises the bridge enable button 611.

In this example the user (Jim Bob) has setup two different voice calls. The first voice call is between Jim Bob, Dave Jones, and Jane Doe in the first communication spotlight 310. The second voice call is between Jim Bob and Fred Willard in the second communication spotlight 610. The user (Jim Bob) drags-in-drops 620 the bridge agent 229 between the first communication spotlight 310 and the second communication spotlight 610. The bridge agent 229 can be considered shown between the first and second communication in various ways, such as via lines (even though not directly between the first and second communication), via a connection, via a placement, and/or the like. The bridge agent 229 bridges the first communication session in the first communication spotlight 310 with the second communication session in the second communication spotlight 610. Based on adding the bridge agent 229, Jim Bob, Dave Jones, Jane Doe, and Fred Willard are now part of the same conference call.

The user can dynamically control the bridge function of the bridge agent 229 by toggling the bridge enable button 611. In the graphical user interface 600, the bridge is enabled (indicated by the black color of the bridge enable button 611). The user can toggle the bridge enable button 611, thus resulting in the bridge between the two calls being disabled. This allows the user to be able to easily bridge/un-bridge the two calls. The bridge agent 229 can also be used to bride a sidebar communication session.

In one embodiment, the user can control the view the bridged/unbridged calls by minimizing one of the calls to un-bridge the communication session. If the user minimizes one of the communication sessions, the two calls are unbridged and the minimized call is placed on hold. The bridge agent 229 can be displayed connected to an individual one of the communication sessions when the other communication session is minimized and the calls are unbridged.

In FIG. 6, the bridge agent is shown as connecting the two calls by the lines from the bridge agent to each communication spotlight (310 and 610). However, the connection may be represented in different ways, such as by dotted lines, background colors, and/or the like.

Figure 7:
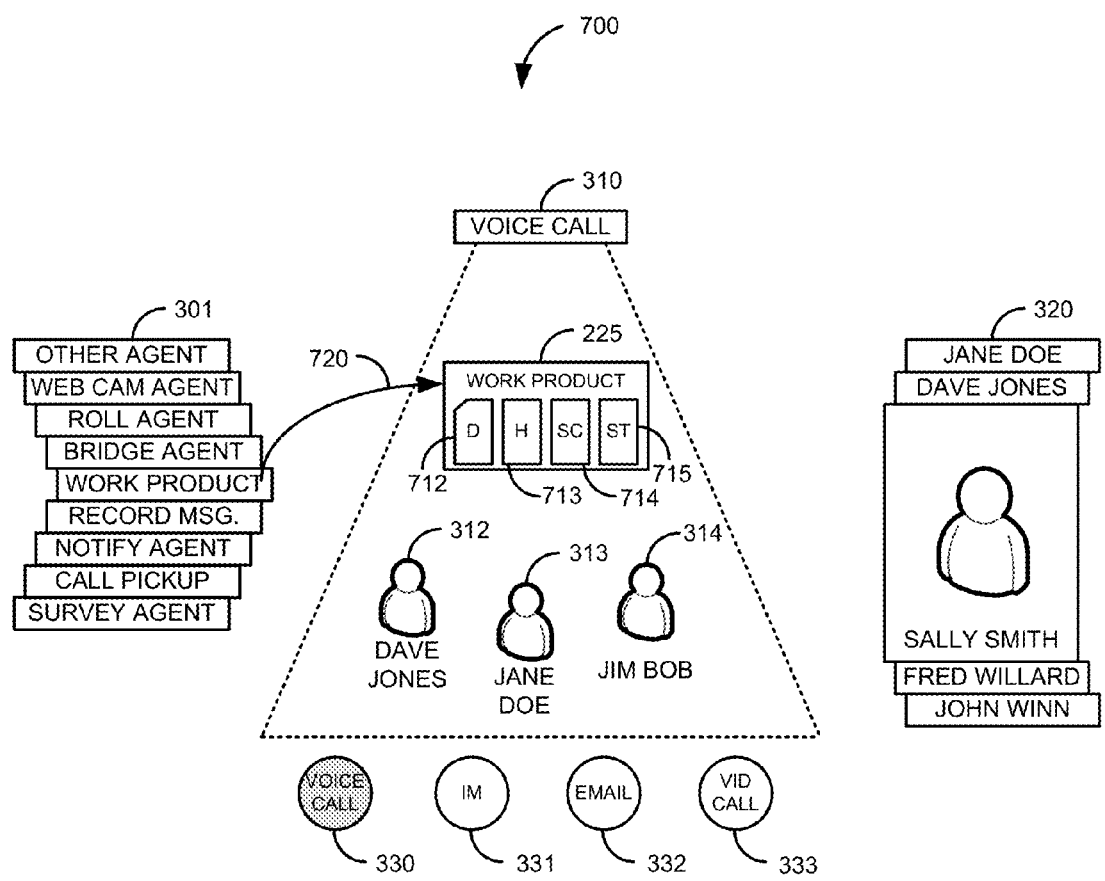
FIG. 7 is a diagram of a graphical user interface for adding a work product agent to a communication session.

FIG. 7 is a diagram of a graphical user interface 700 for adding a work product agent 225 to a communication session. The graphical user interface 700 comprises the liaison agent rolodex 301, the first communication spotlight 310, the user icons 312-314, the user rolodex 320, the voice call button 330, the Instant Message button 331, the email button 332, the video call button 333, and the work product agent 225. The work product agent 225 also comprises a document icon 712, a history icon 713, a schedule icon 714, and a status report icon 715.

In this example, the user (Jim Bob) has created a voice call with Dave Jones and Jane Doe. The user has also dragged-in-dropped 720 a work product agent 225 into the communication session. In this example, the work product agent 225 is seen by all the users in the communication session at their respective communication devices 101. When the user adds the work product agent 225 to the communication session, the user can select from a new work product agent 225 or from a work product agent 225 from an existing communication session (e.g., from a previous communication of a reoccurring conference call). If the work product agent 225 is new, any user (if configured) on the conference call can add documents, histories, schedules, and status reports to the work product agent 225. In one embodiment, this is done by dragging-and-dropping a document, a history, a schedule, and a status report onto the respective icon 712-715. As documents are added, each of the icons 712-715 may show the number of associated documents by displaying a number. In an alternative embodiment, the history is a running history of the current and previous conference calls that is generated by the system.

If one of the users wants to get a document, the user may mouse over one of the icons 712-715 to show a list of the documents or to display the history. The user can then select a specific document that is associated with the communication session.

Figure 8:
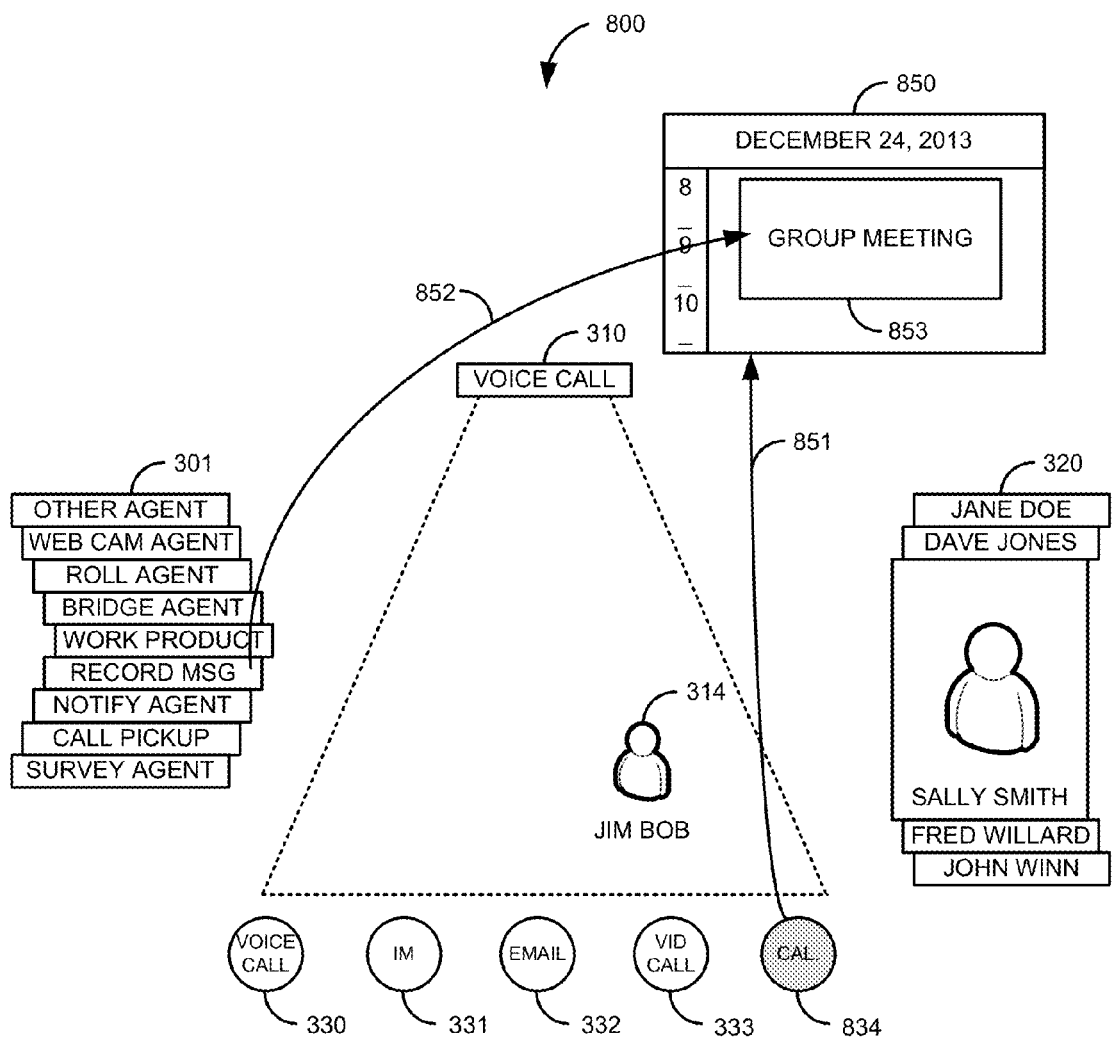
FIG. 8 is a diagram of a graphical user interface for adding liaison agents to future communication sessions.

FIG. 8 is a diagram of a graphical user interface 800 for adding liaison agents 123 to future communication sessions. The graphical user interface 800 comprises the liaison agent rolodex 301, the first communication spotlight 310, the user icon 314, the user rolodex 320, the voice call button 330, the Instant Message button 331, the email button 332, the video call button 333, a calendar button 834, and a calendar window 850. The calendar window 850 comprises a calendar event for a communication session 853.

In this example, the user may add a liaison agent 123 prior to the beginning of a communication session. The user selects 851 the calendar button 834 (indicated by the light grey). This brings up calendar window 850. The user can go through the calendar to find the calendar event for the communication session 853. In this example, the user has found a group meeting on Dec. 24, 2013 (in the future). The user drags-in-drops 852 the record message agent 224 onto the calendar event for the communication session 853. The record message agent 224 is dynamically added to the communication session at the time of the calendar event/ establishment of the communication session (e.g., when one or more of the participants call into a conference bridge indicated by the calendar event for the communication session 853). When the user drags-in-drops 852 the record message agent 224 onto the calendar event for the communication session 853, the calendar event for the communication session 853 may change to show the associated record message agent 224 (e.g., change color or display a new icon in the calendar event for the communication session 853). In this example, the record message agent 224 is dragged-in-dropped onto the calendar event for the communication 853. However, in other embodiments, any type of liaison agent 123 may be dragged-in-dropped onto the calendar event for the communication 853, such as the work product agent 225, the roll agent 226, the notification agent 227, the call pickup agent 228, the bridge agent 229, the web cam agent 230, and the survey agent 231, another agent, any combination of these, and/or the like.

In addition, any liaison agent 123 may be added to a reoccurring calendar event for a communication session 853 or an individual calendar event for the communication session 853. If the calendar event for the communication session 853 is a reoccurring calendar event, the user may be asked if the liaison agent 123 is for a specific calendar event or for all the reoccurring calendar events (such as a work product agent 225).

In one embodiment, the liaison agent 123 may appear similar to a representation of the user in the calendar and/or communication session. The other users will know that the liaison agent 123 is working on behalf of the user based on the representation (e.g., a picture).

To further illustrate, consider the following example. The user (Jim Bob) has a meeting that he cannot make. Jim Bob selects a record message agent 224 that allows Jim Bob to record a message to be played. Jim Bob drags-in-drops 852 the record message agent 224 onto the calendar item for the conference call 853 in the calendar window 850. Jim Bob is prompted by the liaison agent 224 to record the message he wants to play. Jim Bob records a message indicating that he will not be available for the conference call, but that the participants of the conference call can call him later that day. Once the conference begins, the record message agent 224 is displayed as part of the conference call to the participants of the conference call. The record message agent 224 shows a picture of Jim Bob. The record message agent 224 also has a flashing red color that says "Voice Message from Jim Bob." The leader of the call selects the record message agent 224 to play the message to the participants of the conference call. Jim Bob's message is then played to the participants of the conference call.

Figure 9:
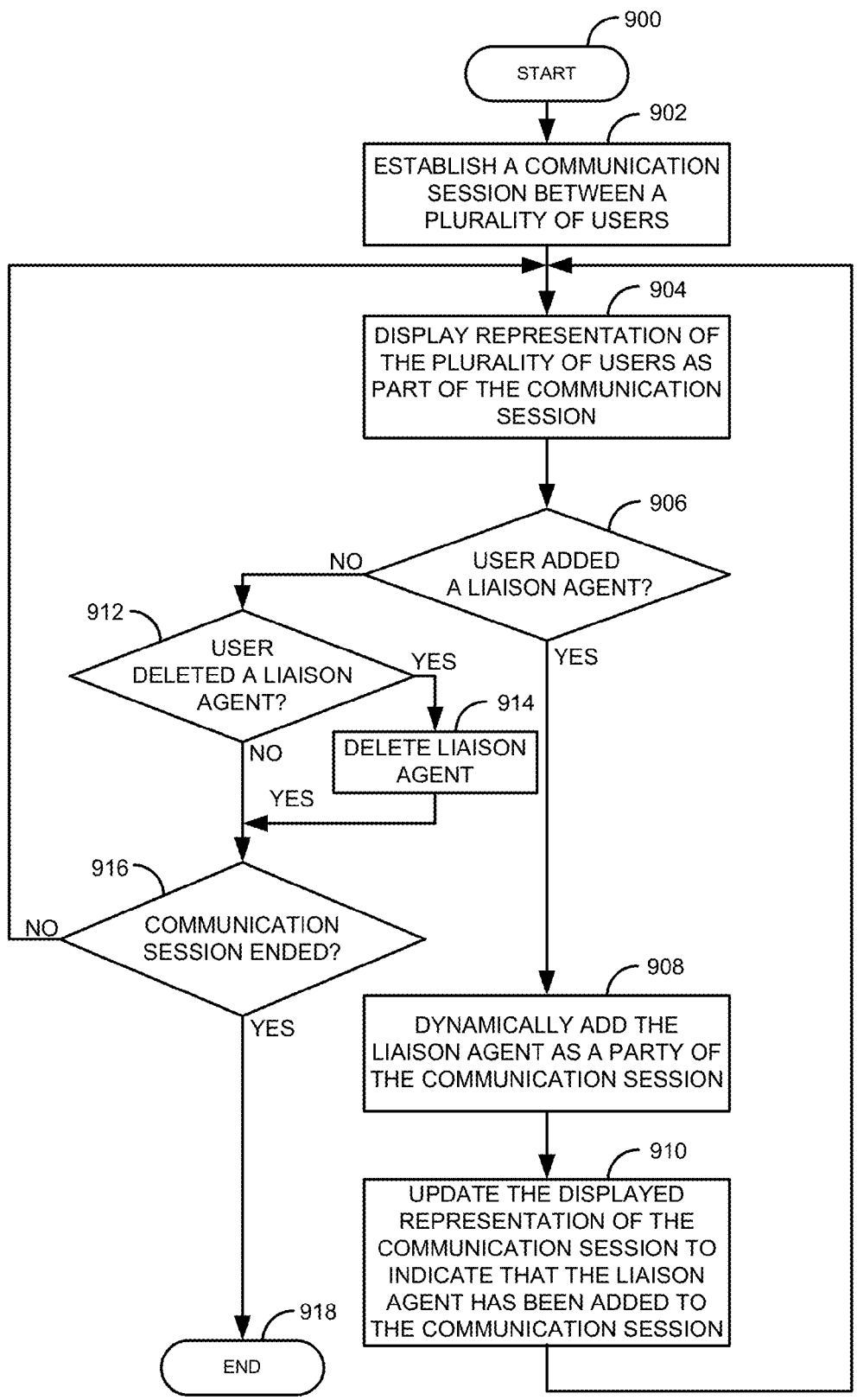
FIG. 9 is a flow diagram of a method for dynamically adding or removing a liaison agent to or from a communication session.
Figure 10:
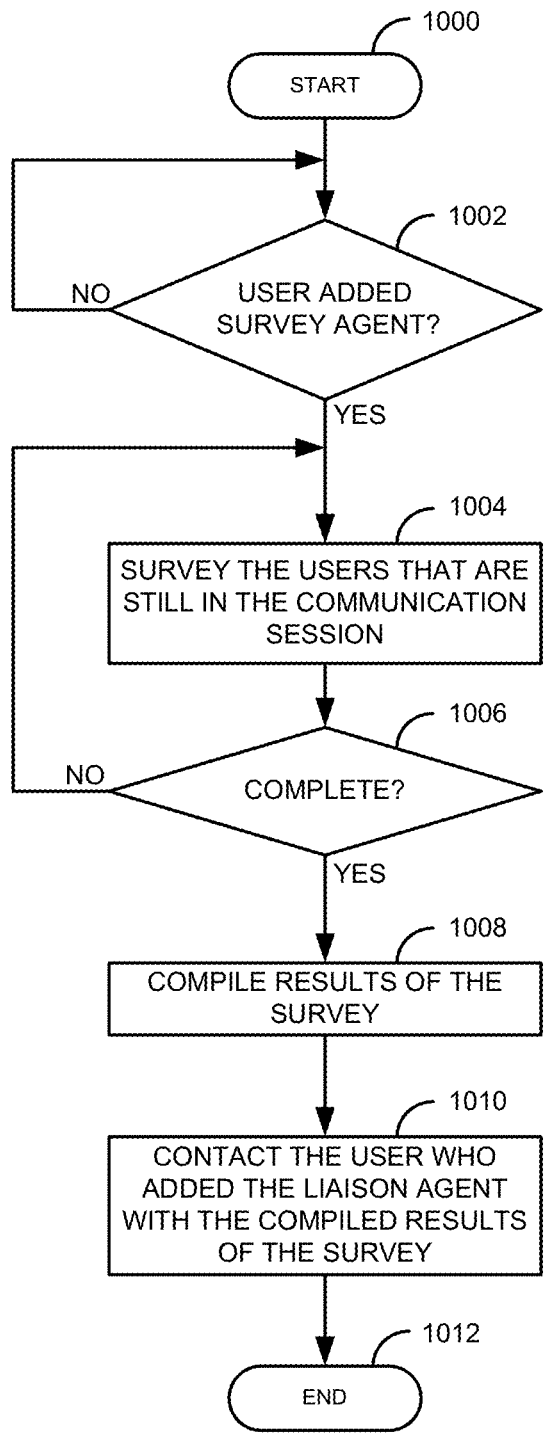
FIG. 10 is a flow diagram of a method for controlling a survey agent.
Figure 11:
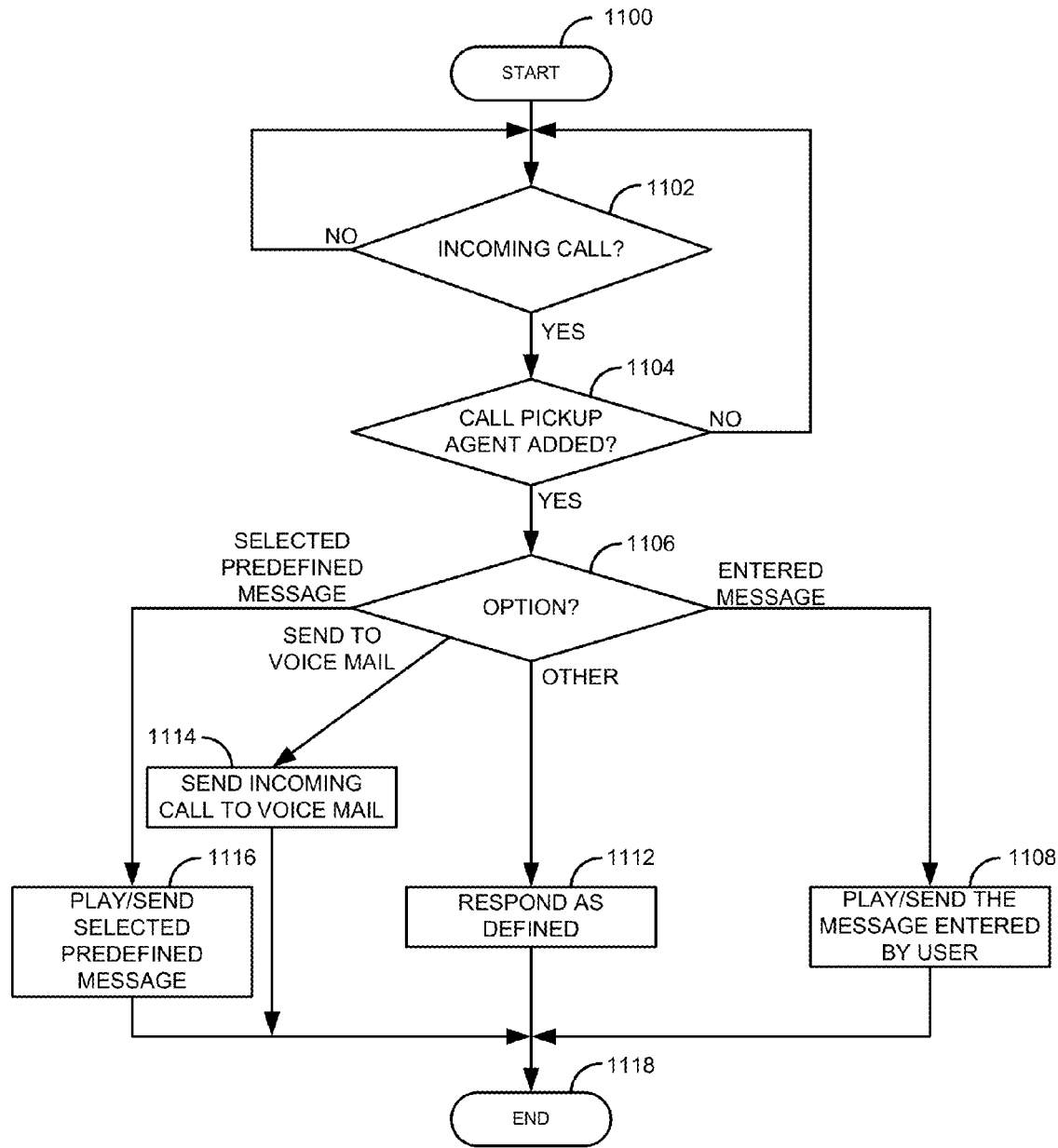
FIG. 11 is a flow diagram of a method for controlling a call pickup agent.

FIG. 9 is a flow diagram of a method for dynamically adding or removing a liaison agent to or from a communication session. Illustratively, the communication devices 101A-101N, the web cam agent 230, the video cameras 211A-211B, the communication systems 120 and 220, the communication manager 121, the display module 122, the liaison agent 123, the record message agent 224, the work product agent 225, the roll agent 226, the notification agent 227, the call pickup agent 228, the bridge agent 229, the web cam agent 230, the survey agent 231, and the video cameras 211A-211B are stored-program-controlled entities, such as a computer or processor, which performs the method of FIGS. 9-11 and the processes described herein by executing program instructions stored in a tangible computer readable storage medium, such as a memory or disk. Although the methods described in FIGS. 9-11 are shown in a specific order, one of skill in the art would recognize that the steps in FIGS. 9-11 may be implemented in different orders and/or be implemented in a multi-threaded environment. Moreover, various steps may be omitted or added based on implementation.

The process starts in step 900. A communication session is established 902 between a plurality of users. A representation of the plurality of users is displayed 904 as part of the communication session. The process determines in step 906 if a user has added a liaison agent in step 906. If the user has added a liaison agent in step 906, the process dynamically adds 908 the liaison agent as a party of the communication session. The liaison agent is an agent that acts on behalf of a user. The process updates 910 the displayed representation of the communication session to indicate that the liaison agent has been added to the communication session. The process goes to step 904.

If the process determines in step 906 that the user has not added a liaison agent, the process determines in step 912 if the user has deleted a liaison agent. If the user has deleted a liaison agent in step 912, the process deletes the liaison agent from the communication session and the display. The process then goes to step 916. A user can delete the liaison agent in various ways, such as dragging-in-dropping, clicking a button, selecting a menu, and the like.

If the user did not delete a liaison agent in step 912, the process goes to step 916. In step 916, the process determines if the communication session has ended. If the communication session has not ended in step 916, the process goes to step 904. Otherwise, if the communication session has ended in step 916, the process ends at step 918.

FIG. 10 is a flow diagram of a method for controlling a survey agent. The process in FIG. 10 starts in step 1000. The process determines in step 1002 if the survey agent has been added to the communication session. If survey agent has not been added to the communication session in step 1002, the process repeats step 1002. If the survey agent has been added to the communication session in step 1002, the process surveys 1004 the users that are still in the communication session (this may also be based on other events, such as the user leaving the communication session, an agenda item, and/or the like). The process determines 1006 if the survey is completed. If the survey is not completed in step 1006, the process goes to step 1004.

Otherwise, if the survey has been completed in step 1006, the process compiles 1008 the results of the survey. The process contacts 1010 the user with the compiled results of the survey. The process ends in step 1012.

The user can define the questions and types of responses based on a template or profile. For example, the user can define a survey by creating an XML file in a defined format.

FIG. 11 is a flow diagram of a method for controlling a call pickup agent. The process starts in step 1100. The process waits in step 1102 for an incoming call to the user. If an incoming call is not detected in step 1102, the process repeats step 1102. Otherwise, if an incoming call is received in step 1102, the process determines in step 1104 if a call pickup agent has been added to an existing communication session. If a call pickup agent has not been added to an existing communication session, the process goes to step 1102.

Otherwise, if a call pickup agent has been added to an existing communication session in step 1104, the process determines in step 1106 an option set/selected by the user. The option may be dynamically selectable by the user or may be based on a defined profile. If the option is for an entered message the process goes to step 1108. The entered message can be a message that is added by the user based on the incoming call (a voice, video, or text call) in a text window or via a voice/video interface. The process plays/sends 1108 the message entered by the user to the caller. For example, the user may enter a message saying to call back in 10 minutes. The message may be played (voice or video) to a voice/video caller or may be sent to an email address of the caller. For example, if the user is engaged in a voice call and the incoming message is a request for an Instant Message session, the process can respond and send the message via Instant Messaging. The type of message that is sent can be based on user defined preferences and/or the type of incoming call. The process then ends in step 1118.

If the user has chosen to send a selected predefined message in step 1106, the process plays/sends 1116 the selected predefined message. The selected predefined message may be sent by email to the caller of the incoming call. The selected predefined message may be sent via Instant Messaging to the caller. The selected predefined message may be a pre-recorded video/voice message that is played to the caller. The user can select the predefined message in various ways, such as from a list, from a menu, and the like; the messages are presented to the user based on the incoming call. The process then ends in step 1118.

If the user selects to direct the incoming call to voice mail in step 1106, the process sends 1114 the incoming call to voice mail. The process then ends in step 1118. If the user has selected another type of option, the process responds 1112 as defined by the user. For example, the process may direct the call to another user based on the user selecting the option from a list. The process then ends in step 1118.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
displaying, by a microprocessor, a representation of a plurality of users as part of an established communication session between the plurality of users;
dynamically adding, by the microprocessor, a first liaison agent as a party of the communication session, wherein the first liaison agent acts on behalf of at least one user during the communication session between the plurality of users, after the at least one user has left the communication session, by surveying other users that are still in the communication session and wherein the first liaison agent contacts the at least one user who is no longer in the communication session when the first liaison agent has compiled results of the survey of the other users that are still in the communication session; and
in response to dynamically adding the first liaison agent as a party of the communication session, updating, by the microprocessor, the displayed representation of the communication session to indicate that the first liaison agent has been added to the communication session.

2. The method of claim 1, wherein a status of the first liaison agent is added to the displayed representation of the first liaison agent and wherein the status of the first liaison agent changes based on one of:
an availability of the first liaison agent; or
an unavailability of the first liaison agent because the first liaison agent is performing the activity.

3. The method of claim 1, further comprising a web cam agent that allows the at least one user to view multiple views of multiple cameras of at least one feed of the communication session.

4. The method of claim 1, further comprising a sidebar communication session off the communication session and a second liaison agent is displayed as part of the sidebar communication session.

5. The method of claim 1, further comprising a second liaison agent that is added by the at least one user during the communication session and wherein the second liaison agent acts on behalf of the at least one user during a time where the at least one user is no longer in the communication session.

6. The method of claim 1, further comprising a second liaison agent that is a bridge agent that bridges the communication session with another communication session and the bridge agent is displayed between the communication session and the other communication session.

7. The method of claim 1, wherein a second liaison agent does one of the following while the at least one user is not part of the communication session:
plays a video based on the event in the communication session;
plays a video during the communication session; or
takes a roll of the plurality of users on behalf of the at least one user who is not part of the communication session and reports the roll to the at least one user who is not part of the communication session.

8. The method of claim 1, further comprising a second liaison agent that is a work product agent that maintains work product from a previous communication session and wherein the work product agent maintains one of:
a document from the previous communication session;
a history of the previous communication session;
a schedule from the previous communication session; or
a status report of the previous communication session.

9. The method of claim 1, further comprising a second liaison agent that is an automated call pickup agent, wherein the at least one user selects how the automated call pickup agent will handle an incoming call, and wherein the automated call pickup agent automatically handles the incoming call based on one of:
a message entered by the at least one user;
sending an email to a caller of the incoming call; or
sending an instant message to the caller of the incoming call.

10. The method of claim 1, wherein the first liaison agent is added prior to the beginning of the communication session and wherein the first liaison agent is dynamically added to the communication session based on the communication session starting.

11. The method of claim 10, wherein the first liaison agent is added prior to the beginning of the communication by adding the first liaison agent to a calendar event of the at least one user prior the communication session starting.

12. A system comprising:
a microprocessor; and
a computer readable memory, coupled with the microprocessor that stores microprocessor readable and executable instructions that program the microprocessor to execute:
a communication manager that establishes a communication session between a plurality of users and dynamically adds a first liaison agent as a party of the communication session, wherein the first liaison agent is an agent that acts on behalf of at least one user during the communication session between the plurality of users, after the at least one user has left the communication session, wherein the first liaison agent acts on behalf of the at least one user by surveying other users that are still in the communication session, and wherein the first liaison agent contacts the at least one user who is no longer in the communication session when the first liaison agent has compiled results of the survey of the other users that are still in the communication session; and
a display module displays a representation of the plurality of users as part of the communication session and dynamically display the first liaison agent as a party of the communication session in response to dynamically adding the first liaison agent as a party of the communication session between the plurality of users.

13. The system of claim 12, wherein a status of the first liaison agent is added to the displayed first liaison agent and wherein the status of the first liaison agent changes based on one of:
an availability of the first liaison agent;
a current activity of the first liaison agent;
an obtained result of an activity of the first liaison agent; or
an unavailability of the first liaison agent because the first liaison agent is performing the activity.

14. The system of claim 12, further comprising a second liaison agent that is a webcam agent that allows the at least one user to view multiple views of multiple cameras of at least one feed of the communication session.

15. The system of claim 12, further comprising a second liaison agent that is added by the at least one user during the communication session and wherein the second liaison agent acts on behalf of the at least one during a time where the at least one user is no longer in the communication session.

16. The system of claim 12, wherein the first liaison agent is added prior to the beginning of the communication session and wherein the first liaison agent is dynamically added to the communication session based on the communication session starting.

17. The system of claim 12, further comprising a second liaison agent that is a work product agent that maintains work product from a previous communication session and wherein the work product agent maintains one of:
a document from the previous communication session;
a history of the previous communication session;
a schedule from the previous communication session; or
a status report of the previous communication session.

18. The system of claim 12, wherein a second liaison agent that is an automated call pickup agent is added to the communication session and wherein the at least one user selects how the automated call pickup agent will handle an incoming call, and wherein the automated call pickup agent automatically handles the incoming call based on one of:
a message entered by the at least one user;
a selection of a predefined message;
sending an email to a caller of the incoming call;
sending an instant message to the caller of the incoming call;
directing the call to another user; or
directing the incoming call to a voicemail of the at least one user.

19. The method of claim 7, wherein the second liaison agent takes the roll of the plurality of users on behalf of the at least one user who is not part of the communication session and reports the roll to the at least one user who is not part of the communication session.

20. The method of claim 9, wherein the automated call pickup agent automatically handles the incoming call by sending an instant message to the caller of the incoming call.

* * * * *